March 11, 1969 H. P. XANDER 3,432,178
DEVICE FOR ROLLING BABY CARRIAGES ON STAIRS
Filed July 13, 1967

March 11, 1969 H. P. XANDER 3,432,178
DEVICE FOR ROLLING BABY CARRIAGES ON STAIRS
Filed July 13, 1967 Sheet 2 of 2

INVENTOR
Heinz Peter Xander
BY Peter M. Bosely
ATTORNEY

United States Patent Office 3,432,178
Patented Mar. 11, 1969

3,432,178
DEVICE FOR ROLLING BABY CARRIAGES ON STAIRS
Heinz Peter Xander, Dunantring 66, Frankfurt am Main-Sossenheim, Germany
Filed July 13, 1967, Ser. No. 653,173
Claims priority, application Germany, July 20, 1966,
X 67
U.S. Cl. 280—5.22
Int. Cl. B62b 9/02
4 Claims

ABSTRACT OF THE DISCLOSURE

Device attachable between a front wheel and a rear wheel on the same side of a baby carriage to permit its rolling up and down stairs. The device comprises a movable band adapted to run on stairs by means of guide rollers attached to the lower end of two longitudinal bars shaped to conform to the circumference of the wheels of the baby carriage between a front and a rear wheel thereof. In the operative position of the device the elastic band is stretched and rolls on the edges of the steps of the stairs while concave rollers inside the longitudinal bars roll on the circumference of the baby carriage wheels and are held in engagement therewith by the traction exerted by the elastic band.

---

This invention relates to a device for rolling baby carriages on stairs.

Many solutions to the problem of transporting baby carriages on stairs have already been proposed. One such solution consists, for example, in the provision of rotatable stalking devices adapted to be brought into engagement with a wheel pair of the baby carriage. It is true that all these devices bridge the height of the steps of the stairs by supporting means from one edge of a step to another, but they are all too heavy and unhandy not only in their construction but also with respect to their detachable arrangement. Also a certain amount of jolting cannot be avoided thereby when going on stairs.

The device according to the invention, on the other hand, is very small in size and of light weight. It is preferably made of plastics and consists of two parts. It can be secured in position between a front and a rear wheel on one side of a baby carriage by a single manipulation, it being only necessary to slightly tilt the baby carriage to free two of its wheels.

The device for rolling baby carriage on stairs according to the invention comprises an elastic band adapted to run on stairs, at least two longitudinal bars of U-shaped cross section swingably mounted between a front wheel and a rear wheel on one side of a baby carriage and suitably curved to conform to the circumference of the baby carriage wheels, two parallel rigid T-shaped guide members arranged between the longitudinal bars and pivotally connected with the arms of the T to the longitudinal bars, the longitudinal bars being swingable against the action of the elastic band, concave rollers on the inside of the longitudinal bars and adapted to engage the circumference of the baby carriage wheels, and guide rollers for the elastic band at the lower ends of the longitudinal bars.

The tension occurring in the operative position of the elastic band produces a lever action which tends to urge the longitudinal bars firmly against the wheels of the baby carriage. The lever pressure is produced by the fact that the two longitudinal bars are pivotally mounted in the lower third of their length on the T-shaped guide members. The object of the elastic band in its operative position is, on the one hand, the elastic absorption of the impacts produced by the steps of the stairs and, on the other hand, the blocking of the device without additional holding means. The concave rollers provided in the longitudinal bars in their operative position engage the wheels of the baby carriage and are adapted to roll thereon.

As mentioned above, the device can be easily brought into engagement with the wheels of the baby carriage. While one side of the baby carriage is slightly lifted with one hand the upper ends of the longitudinal bars are pressed together with the other and the device is inserted between the wheels from below. Since the two longitudinal bars are adapted in their shape to the circumference of the baby carriage wheels and pass beyond the culmination point thereof, they are rigidly retained in this position. The removal of the device is effected by a downwardly directed pull exerted thereon with the result that the device will roll out of its blocked position. The elastic band will then spring back into its released position, moving the longitudinal bars apart and simultaneously contracting its outer guide rollers. To permit the device to be accommodated in a small space, the upper parts of the longitudinal bars are arranged to be tiltable outwardly by means of hinges.

A preferred embodiment of the invention will now be described by way of example and with reference to the accompanying drawings, in which.

Figure 1:
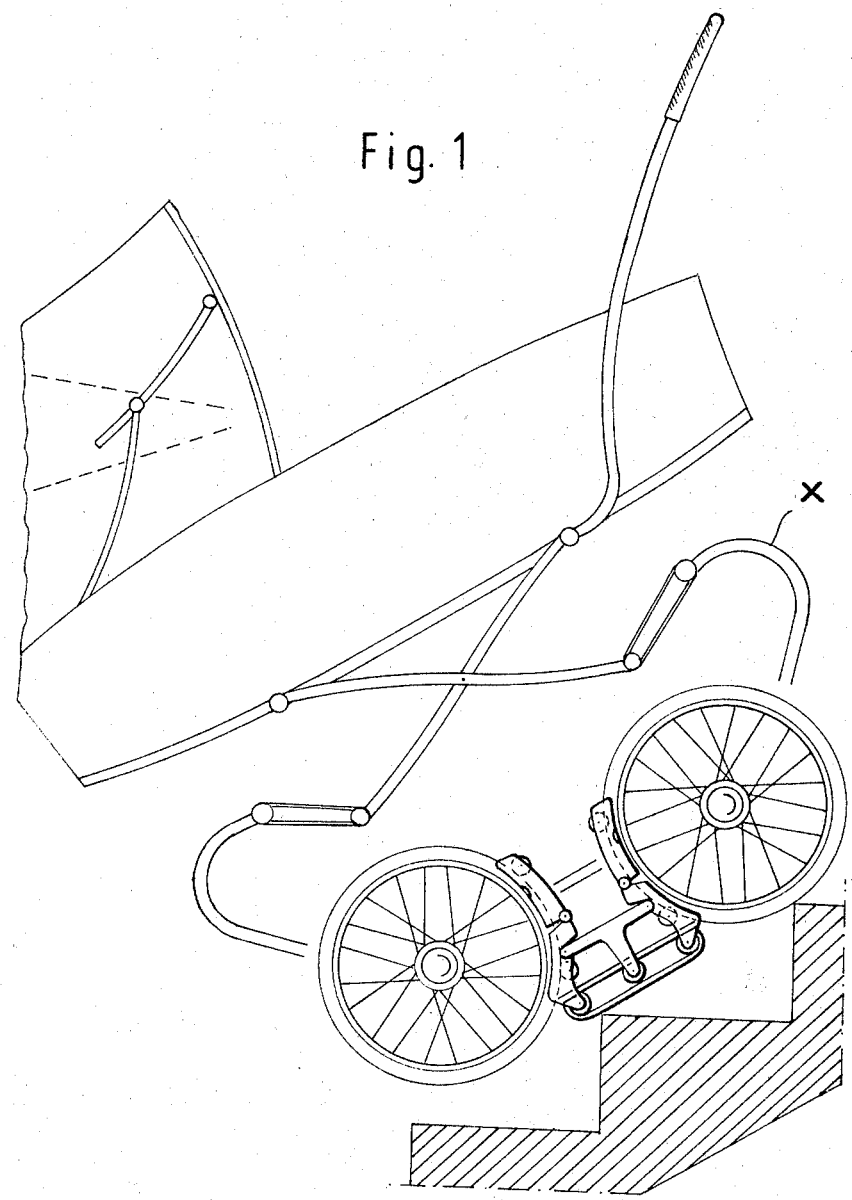
FIG. 1 is a schematic view of a device according to the invention for rolling baby carriage on stairs, showing the device in its operative position between a front wheel and a rear wheel of the baby carriage.
Figure 2:
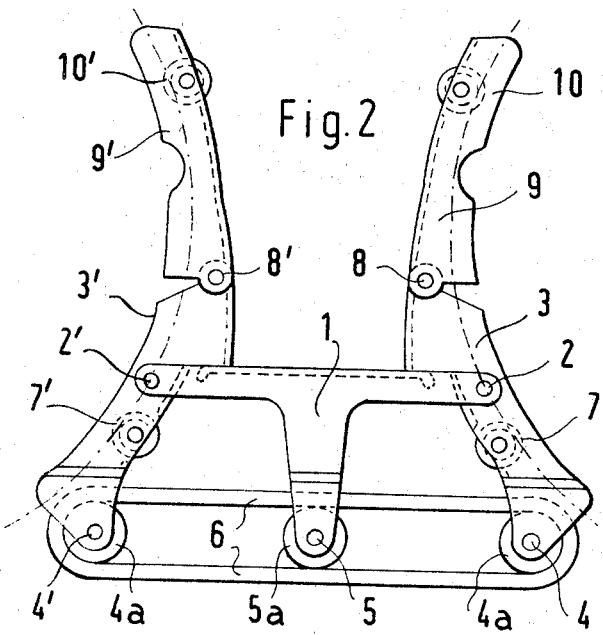
FIG. 2 is a lateral view of the device in its stretched position.
Figure 3:
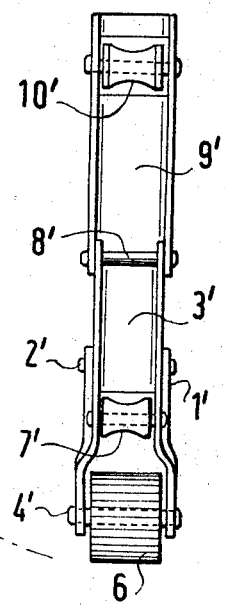
FIG. 3 is an end view of a longitudinal bar.
Figure 4:
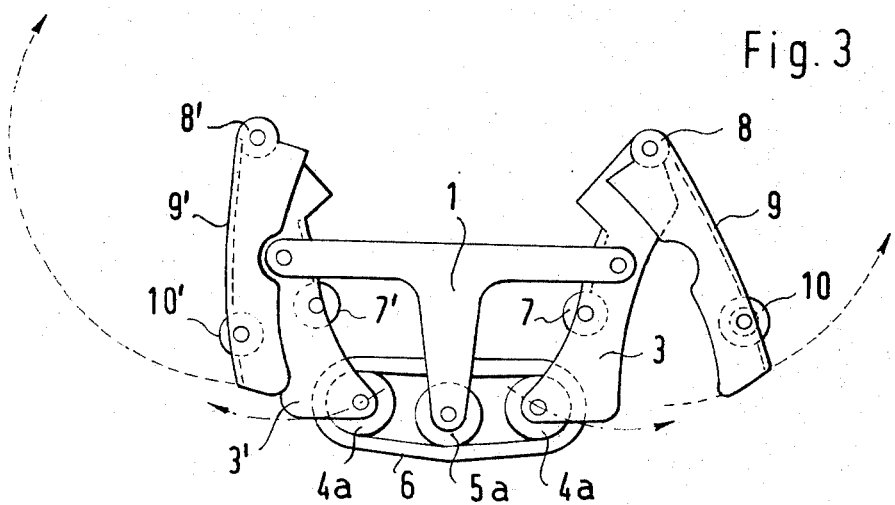
FIG. 4 is a lateral view of the device in its released compact condition.

Referring now more particularly to FIG. 2, the device according to the invention comprises two parallel rigid T-shaped guide members 1 and $1^1$ between the ends of which longitudinal bars 3 and 9 as well as $3^1$ and $9^1$, U-shaped in cross section, are mounted on pivots 2 and $2^1$ so that they can be swung against the action of an elastic band 6 adapted to run on stairs. At the lower ends of the longitudinal bars 3 and $3^1$ there are rotatably mounted on axles 4 guide rollers 4a for the elastic band 6. On the inside of the longitudinal bars 3 and 9 as well as $3^1$ and $9^1$ of U-shaped cross section there are rotatably mounted concave rollers 7 and 10 as well as $7^1$ and $10^1$ adapted to roll on the surface of the wheels of the baby carriage x (FIG. 1). A further guide roller 5a for the elastic band 6 is mounted on an axle 5 at the lower end of the T-shaped guide members 1 and $1^1$. The longitudinal bars 9 and $9^1$ are pivotally connected to the longitudinal bars 3 and $3^1$ respectively by means of axles 8 and $8^1$, so that the longitudinal bars 9 and $9^1$ can be tilted down outwardly to reduce the size of the device.

As can be seen from FIG. 1, the elastic band 6 bridges the distance between the wheel pair on one side of the baby carriage from the edge of one step of the stairs to the next one.

I claim:

1. A device for rolling baby carriages on stairs, comprising
   an elastic band adapted to run on stairs,
   at least two longitudinal bars of U-shaped cross section swingably mounted between a front wheel and a rear wheel on one side of a baby carriage and suitably curved to conform to the circumference of said baby carriage wheels,
   two parallel rigid T-shaped guide members arranged between said bars and pivotally connected with the arms of the T to said longitudinal bars,
   said longitudinal bars being swingable against the action of said elastic band, concave rollers on the inside of said longitudinal bars and adapted to engage the circumference of the baby carriage wheels, and guide rollers for said elastic band at the lower ends of said longitudinal bars.

2. A device as claimed in claim 1, wherein the fulcra of said longitudinal bars are provided in the lower third of their length.

3. A device as claimed in claim 1, wherein a third guide roller for said elastic band is provided at the lower end of said parallel rigid T-shaped guide members.

4. A device as claimed in claim 1, wherein said longitudinal bars each comprise a lower and an upper swingable part interconnected by pivot axles so that the upper part can be pivoted down toward the lower part and the operative position of the swingable parts is limited by abutments.

References Cited

UNITED STATES PATENTS 787,472   4/1905   Schuster _____ 280—5.24

FOREIGN PATENTS 163,467   7/1949   Austria.

RICHARD J. JOHNSON, *Primary Examiner.*